BOLTON AVIS.
Improvement in Potato-Diggers.
No. 126,619.  Patented May 14, 1872.
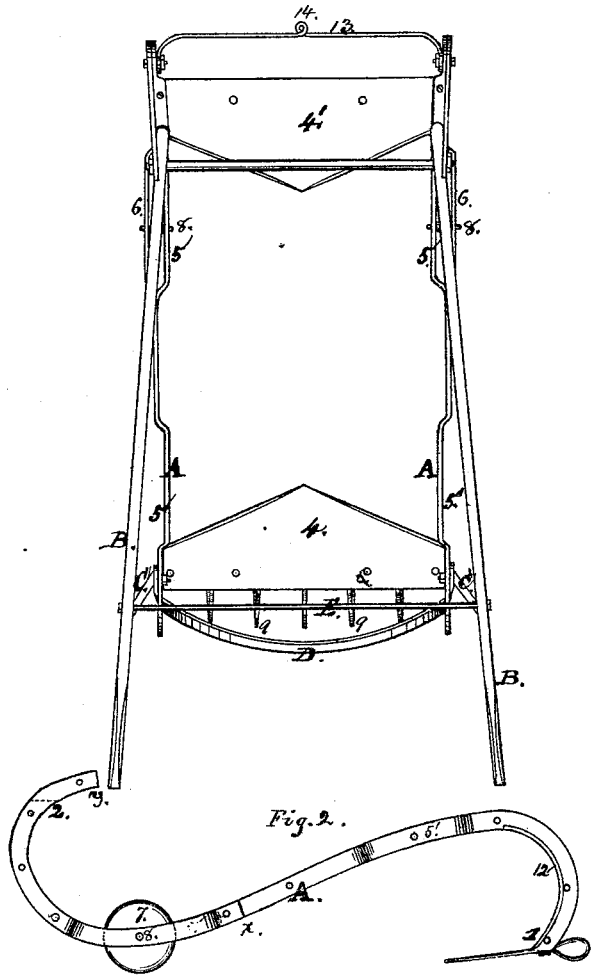
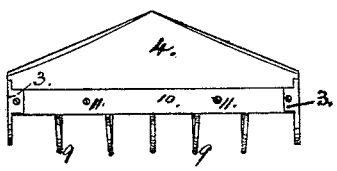
Witnesses.
N. C. Cassell
W. Bradford
Bolton Avis.
by John J. Halsted.
his Attorney.

UNITED STATES PATENT OFFICE.

BOLTON AVIS, OF PENN'S GROVE, NEW JERSEY.

IMPROVEMENT IN POTATO-DIGGERS.

Specification forming part of Letters Patent No. 126,619, dated May 14, 1872.

SPECIFICATION.

*To all whom it may concern:*

Be it known that I, BOLTON AVIS, of Penn's Grove, in the county of Salem and State of New Jersey, have invented an Improved Sweet-Potato Digger; and I do hereby declare that the following, taken in connection with the drawing which accompanies and forms part of this specification, is a description of my invention sufficient to enable those skilled in the art to practice it.

My improvements have for their object simplicity and strength of construction, with great efficiency of operation, both in the cutting of of the vines and in the digging of the potatoes; and they consist mainly in making the body of the frame which supports the cutting-wheels, the hoe or digger, and the earth-cutters in an S-shaped form; in sustaining each cutting-wheel in a yoke formed by a bend in the S-shaped piece, and by a corresponding bend in a lapping piece which continues beyond the terminus of the S-piece, and connects with the handle; and, as incidental to my peculiar mode of construction, it further consists in a reversibility of the S-shaped frame, whereby the share, when dulled, may with its frame be inverted and reversed and thrown out of action, and another reserve share (until then serving as a strengthening brace) be brought into action.

In the drawing, Figure 1 is a plan view, and Figs. 2 and 3 detailed views.

A A represent iron S-shaped side pieces, forming the main part of the frame; these extend from 1 to 2, and at both ends each piece is bent inward, as seen in Fig. 3, to form a short ledge, 3, to which the hoes or shares 4 4' may be secured, the reserve share 4' serving, when not in use for digging, as a strong cross-brace for the whole structure. Two bends, 5 5', are made at two different points in the side pieces, at equal distances from the two ends; one similar bend is also made in each end of the parts 6 6, which parts reach from *x* to *y* and coincide in curvature (so far as they lap thereon) with the side pieces A; these bends in the two pieces, when placed together, forming, as seen in the drawing, a strong yoke and protection for the vine-cutting wheels 7, which, as seen, are hung to revolve therein; the axis 8 of the wheel having its bearings in the opposite sides of such yoke. B B are the wooden handles. C C are upright supports connecting these handles to the parts A A; and D is a strong cross-piece connecting the parts A A, and having an upward curve sufficient to permit the plants, &c., to clear it. E E are cross-rods or braces, and by means of which the parts are attached to the handles, screw-threads on the rods and removable nuts allowing the tightening up or loosening of the parts. To invert and reverse the S-shaped parts the side pieces are unscrewed from the handles, the upper ends brought down with their share to occupy the position previously occupied by the lower ends and their shares, the cutter-wheels are shifted to the bend 5', which now becomes the forward one, and the parts are secured together and the whole is again ready for operation.

It will be observed that when this reversal takes place the cutting-edge of the upper or non-acting share is always turned inward, so as not to endanger the workman or the horses.

Wire-looped separators or disintegrators 9 9, secured to a plate, 10, are made attachable to and removable from the share, as seen, by screws 11 11, and one may be used for both shares. The looped wires are placed near enough together to break up the dirt and leave the potatoes free. Steel earth-cutters 12 12, having a concave cutting-edge, should be secured at the forward edge of the rearward curvature of the side pieces, as seen at 12. The weight of the forward part of the implement is made sufficient to insure the proper sinking of the vine-cutting wheels into the earth enough to cut the vines with which they come in contact, the two parts of the yoke on opposite sides of each wheel tending to aid largely in accomplishing this. A cross-piece, 13, with a hook or loop, 14, serves for attaching the horse to the implement. The pieces A may extend to and be connected with the handles; in such case, a short bent piece may serve for one of the bearings of the wheel.

This implement is adapted not only for sweet-potato vines, but for any kindred vines having tuberous roots.

I claim—

1. In a sweet-potato digger the combination, with the handles, of S-shaped side pieces having at their rear a hoe or blade, connecting the same together.

2. I also claim, in combination with S-shaped side pieces, the auxiliary pieces 6, serving both to connect the same with the handles and also to form with said side pieces yokes for supporting the wheels.

3. I also claim the described construction and arrangement of the side and auxiliary pieces, and of the bends therein, and of their hoes, whereby upon inverting and reversing the parts the cutter-wheels may be shifted forward from one yoke to another, as shown and described.

BOLTON AVIS.

Witnessed by—
JAMES S. TAYLOR,
EPHRAIM WATERS.